United States Patent [19]

Bouchard et al.

[11] Patent Number: 4,498,883
[45] Date of Patent: Feb. 12, 1985

[54] METHOD OF ENCAPSULATING A PHOTOFLASH LAMP USING A POWDERED RESIN

[75] Inventors: Andre C. Bouchard, Peabody; Harold H. Hall, Jr., Marblehead, both of Mass.

[73] Assignee: GTE Products Corporation, Stamford, Conn.

[21] Appl. No.: 514,440

[22] Filed: Jul. 18, 1983

Related U.S. Application Data

[63] Continuation of Ser. No. 308,636, Oct. 5, 1981, abandoned.

[51] Int. Cl.³ ............ B29C 6/04; H05B 41/32
[52] U.S. Cl. ................ 445/28; 264/138; 264/162; 264/272.16; 362/13; 431/359; 431/360
[58] Field of Search .......... 362/11, 13, 14, 15; 431/359, 360; 29/841; 264/272.16, 138, 162; 445/28

[56] References Cited

U.S. PATENT DOCUMENTS 3,194,953  7/1965  Friedland ............... 264/272.16
3,315,071  4/1967  Pfefferle .
3,322,992  5/1967  Parker et al. ........... 264/272.16
3,352,953  11/1967 Zavitz et al. .
3,612,850  10/1971 Nijland .................. 431/94
3,860,740  1/1975  Watkins ................. 29/588
3,992,136  11/1976 Shaffer .................. 431/360
4,200,901  4/1980  Shaffer et al. .......... 362/5

Primary Examiner—James Lowe
Attorney, Agent, or Firm—Lawrence R. Fraley

[57] ABSTRACT

A method of forming a protective coating on a glass envelope of a photoflash lamp. The method comprises the steps of orienting the lamp within a mold member such that the external surfaces of the lamp's glass envelope do not contact the internal surfaces of the mold, depositing a quantity of powdered thermoplastic or thermosetting resin within the mold such that the resin surrounds the entirety of the glass envelope's external surfaces, simultaneously applying pressure and heat to the powdered material to cause it to liquify, and thereafter cooling the liquified material to form a light-transmitting, solid polymer member having the glass envelope located therein. Pressures within the range of about 500 to 8000 pounds per square inch were possible without fracturing the glass envelopes or adversely effecting the components therein. The finished product is ideally suited as one component of a multilamp photoflash device for use with many of today's cameras.

14 Claims, 11 Drawing Figures

METHOD OF ENCAPSULATING A PHOTOFLASH LAMP USING A POWDERED RESIN

This is a continuation, of application Ser. No. 308,636, filed 10/05/81 now abandoned.

TECHNICAL FIELD

The invention relates to methods of positively containing lamps with a protective material, and more particularly, to containing lamps of the photoflash variety.

BACKGROUND

A typical photoflash lamp comprises an hermetically sealed glass envelope, a quantity of combustible material located in the envelope, such as shredded zirconium or hafnium foil, and a combustion-supporting gas, such as oxygen, at a pressure well above one atmosphere (e.g. 8–12 atmospheres). The lamp also includes an electrically or percussively activated primer for igniting the combustible to flash the lamp. During lamp flashing, the glass envelope is subjected to severe thermal shock due to hot globules of metal oxide impinging on the walls of the lamp. As a result, cracks and crazes occur in the glass and, at higher internal pressures, containment becomes impossible. Understandably, it is essential to contain the glass envelope in order to protect the consumer who uses the typical photoflash device having at least one and usually several (e.g., 4, 6, 8 or 10) such lamps located therein.

Heretofore, there have been several diverse techniques employed to provide coatings on lamps of the type defined. One approach has been to reinforce the glass envelope by applying a protective coating of cellulose acetate lacquer on the lamp envelope by means of a dip process. In the typical dip process, a large number of envelopes are loaded onto a rack and then sequentially dipped in the cellulose acetate lacquer and oven-dried a sufficient number of times to build up the desired coating thickness. The process is time-consuming, generally requires a large area of production floor space and involves considerable hand labor, all of which add significantly to manufacturing costs. The solvent, generally comprising acetone, is highly flammable and introduces a high risk of fire by ignition of vapors in either the dip bath or drying oven. Injuries of personnel can thus occur, as well as the increased opportunity for, equipment downtime. In addition, consumption of fire extinguishing chemicals resulting from solvent fires further adds to the manufacturing costs.

Another technique utilized in the industry has been to employ a special hardglass material for the envelope, in addition to a protective dip coating. An example of such a glass material is described in U.S. Pat. No. 3,506,385 (K. H. Weber et al). This material, borosilicate, typically consists essentially of the following constituents: 60 to 75 percent by weight $SiO_2$, 10 to 25 percent by weight $B_2O_3$, 1 to 10 percent by weight $Al_2O_3$, 4 to 10 percent total alkali oxides (e.g., Na, K and Li oxides), and 0 to 5 percent by weight BaO. Although providing some degree of improvement in the containment capability of lamp envelopes, the use of dip coatings and hardglass also present significant disadvantages in the area of manufacturing cost and safety. More specifically, the hardglass incurs considerable added expense over the more commonly used softglass due to both increased material cost and the need for special lead-in wires (e.g., iron-nickel-cobalt alloy) to provide sealing compatibility with the hardglass material. In addition, even though more resistant to thermal shock, hardglass envelopes can also exhibit cracks and crazes upon lamp flashing, and, thus, do not obviate the need for a protective coating.

A further procedure has involved the application of photopolymer coatings to the lamp envelope and thereafter curing these coatings by irradiation with a source of ultraviolet (UV) light. In one example, the lamp is held vertically with the base up and dipped into a vat of the photopolymer at 60° C. and extracted very slowly, the dip process taking about 45 seconds. The resulting coating thickness is about 0.020 inch. According to an alternative approach of the method, the flashlamp, while revolving, is sprayed with the liquid photopolymer and then transferred directly into the ultraviolet lamp chamber. Added reinforcement is possible by the use of glass fibers which, for example, may be wrapped about the envelope prior to dipping in the liquid photopolymer, or by premixing short fibers in the photopolymer and applying the coating having said fibers therein. A somewhat critical aspect of the aforementioned UV cured coating is that the shape and uniformity of thickness depends on the flow characteristics of the photopolymer resin as influenced by the force of gravity, orientation of the lamp after coating, and viscosity of the resin. Changes in resin viscosity resulting from changes in temperature affect both the repeatability of the shape of the coating and the uniformity of thickness. These irregularities are retained once the coating is hardened. To overcome this, it has been necessary to design complex manufacturing equipment and to completely re-orient (to a horizontal position) the lamp envelopes during coating. An example of this more recent method, as well as apparatus for applying such a coating, is described in U.S. Pat. No. 4,197,333 (B. H. Leach et al).

Still another approach to providing an improved containing vessel is described in U.S. Pat. No. 3,893,797, (H. L. Hough et al) wherein a thermoplastic coating, such as polycarbonate, is vacuum formed onto the exterior surface of the glass envelope. The method of applying the coating comprises: placing the glass envelope within a preformed sleeve of the thermoplastic material; drawing a vacuum in the space between the thermoplastic sleeve and the glass envelope; and, simultaneously heating the assembly incrementally along its length, whereby the temperature and vacuum cause the thermoplastic to be incrementally formed onto the glass envelope with the interface substantially free of voids, inclusions and the like. This method provides an optically clear protective coating by means of a significantly faster, safer, and more economical manufacturing process, which may be easily integrated on automated production machinery.

Yet another substantially earlier approach to applying protective coatings for lamps is disclosed in U.S. Pat. No. 3,223,273 (L. Thorington), wherein the exterior surface of the glass envelope of an incandescent lamp is coated with an adhesive resin such as a phenyl or methyl polysiloxane, and then wrapped with a layer of fiber glass yarn having an index of refraction about the same as that of the resin. Prior to wrapping, the yarn is treated with a wetting agent in solvent solution form. Upon completing the dipping and wrapping processes, the covered lamp is placed in a baking oven to cure the resin. The lamp may then be redipped in resin and again cured. Although providing a relatively strong lamp coating, this approach is characterized by many of the same manufacturing disadvantages of the aforementioned solvent dipping process.

In U.S. Pat. No. 3,612,850 (L. M. Nijland et al), there is described a procedure for surrounding portions of individual lamp envelopes in a multilamp device for purposes of hopefully preventing possible lamp explosion. As shown therein, an acrylate resin (e.g., a methyl methacrylate monomer polymerized by the addition of benzoyl peroxide) is located along and substantially about the longitudinal side walls of each envelope after the structure, including all four lamps and corresponding individual reflectors, is arranged in a mold. There are several disadvantages with this technique. Firstly, it fails to assure total lamp containment in view of the apparent necessity for exposing large areas of each lamp's upper and lower regions. Accordingly, it is essential in U.S. Pat. No. 3,612,850 to provide additional safety means such as the illustrated base and outer cover components. It is also apparent from this patent that the apparatus utilized to provide the desired partial containment must be relatively complex in order to assure aligned orientation of the several reflectors and lamps while locating the acrylate resin in place. In view of this requirement, the method does not readily lend itself to mass production at relatively low costs, nor can the method be easily adapted to processing of photoflash devices of different configurations, e.g., the more recently introduced, substantially planar 8 and 10 lamp electrically-activated devices such as described and illustrated in U.S. Pat. Nos. 4,169,281 (B. G. Brower et al.) and 4,282,559 (E. G. Audesse et al).

DISCLOSURE OF THE INVENTION

It is a primary object of the present invention to provide a new and unique method of forming a protective covering on a lamp, particularly photoflash lamps.

It is a further object of the invention to provide such a method which overcomes the several mentioned disadvantages associated with the techniques described above. Specifically, the invention is readily adaptable to mass production, is relatively inexpensive to utilize, and is capable of producing a finished component having several (e.g. 10) individual lamps strategically arranged therein, each being totally encapsulated to maximize protection during flashing. The method utilizes a minimal amount of encapsulant per device, thus further reducing the cost of the end product. It is also readily capable of containment of lamps within a variety of different configurations, although it will be understood from the following that the preferred lamp orientation is planar with a series of lamps (e.g., 5) in each of two parallel rows. In its broadest aspect, the invention is of course capable of providing positive containment of but a single photoflash lamp.

In accordance with one aspect of the invention, there is provided a method of forming a protective coating on the glass envelope of a photoflash lamp, the method comprising the steps of: orienting the lamp within a mold member such that the glass envelope of the lamp is spacedly located from the mold member's internal surface; positioning a quantity of powdered resin material within a mold member such that it surrounds the external surfaces of the glass envelope; applying both heat and pressure to the powdered material to cause it to liquify about the glass envelope; cooling the liquified material to form a light-transmitting, solid polymer member having the glass envelope located therein; and removing the solid polymer member and glass envelope from the mold member.

In accordance with another aspect of the invention, there is provided a method for simultaneously forming a protective coating on a plurality of photoflash lamp glass envelopes, the method comprising the steps of: orienting the lamps in a predetermined pattern within a mold member such that each of the glass envelopes are spaced from the mold member's internal cavity surfaces; positioning a quantity of powdered resin within the cavity of the mold member and applying heat and pressure thereto such that the powdered material liquifies about each of the glass envelopes; cooling the liquid material to form a light-transmitting, solid polymer member having the glass envelopes located therein; and removing the polymer member and glass envelopes from the mold member.

BEST MODE FOR CARRYING OUT THE INVENTION

For a better understanding of the present invention together with other and further objects, advantages, and capabilities thereof, reference is made to the following disclosure and appended claims in connection with the above-described drawings.

Figure 1:
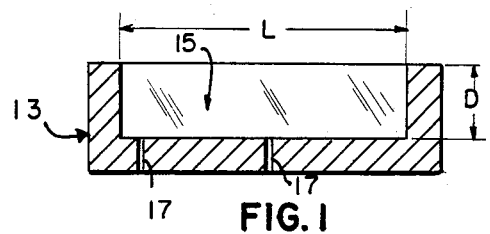
FIGS. 1-6 illustrate the various steps in a method of applying a protective coating to the glass envelope of at least one photoflash lamp in accordance with one embodiment of the invention.

With particular reference to FIG. 1, there is illustrated a mold member 13 which defines therein a central, boxlike cavity 15. Member 13 is preferably metallic (e.g., hardened tool steel or aluminum) with the internal surfaces defining cavity 15 having a mirror or polished finish. Cavity 15 is designed to define a finished article (FIG. 8) having a substantially boxlike external configuration. Accordingly, the cavity has a depth (dimension "D" in FIG. 1) of about 0.25 inch, a length (dimension "L") of about 1.25 inch, and a width of about 1.00 inch. The width dimension is understandably not illustrated in FIG. 1 but represents the distance extending into the drawing from the viewer's location thereabove. Located within the bottom portion of mold 13 are a plurality of holes 17 each designed for accomodating a respective one of the lead-in wires 19 of a photoflash lamp 21. The photoflash lamps described herein are those of the electrically-activated variety and therefore include a pair of (two) lead-in wires which project from one end of the lamp's glass envelope 22. More specifically, each of the lamps encapsulated in the finished polymer article (FIG. 8) produced in accordance with the invention's teachings is defined as being of the subminiature variety. Each envelope 22 has an external diameter of only about 0.165 inch and an overall length of only about 0.500 inch. The glass material for the envelope may be softglass (e.g., soda lime or lead) or hardglass (e.g., borosilicate). Lead-in wires 19 are metallic, and of any suitable metal or alloy used in the art. The arrangement of lamps can also be illustrated in FIG. 8. It is understood with regard to the invention, however, that lamps other than those that are electrically activated may be successfully encapsulated using the teachings hereof. One specific example of such an alternate lamp is one known in the art as a percussively-ignitable photoflash lamp. Such a lamp includes a singular metallic tube projecting from one end of the glass envelope and containing therein a suitable primer material which, when the tube is deformed, deflagrates upwardly into the envelope to ignite the combustible material located therein. Understandably, should it be desirable to encapsulate such lamps, it would not be necessary to provide holes 17 within the mold member 13. Both electrically-activated and percussively-ignitable photoflash lamps are well known in the art and further description is not therefore believed necessary.

Figure 2:
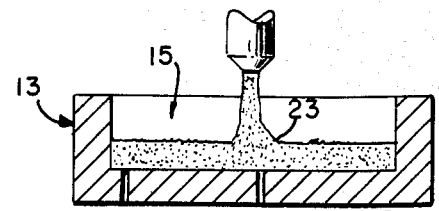
Figure 3:
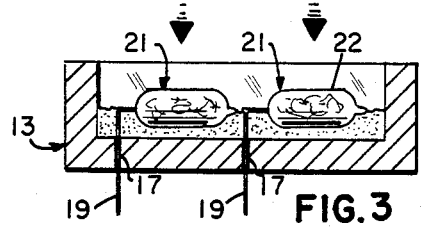

In FIG. 2, a predetermined quantity of a resin powder 23 is shown as being deposited within the cavity 15 of mold member 13. A total of about 0.10 ounces of powder was added in this initial step. The preferred material for use herein is a thermoplastic resin powder, available from the Buehler Corporation, Evanston, Ill., and described as No. 1385 AB transoptic powder. It is understood that other resin powder materials can be successfully used in the instant invention, including the thermosetting resins. These include epoxy, melamine, phenolic, urea, polyester, and silicone. It is only necessary that the above materials be capable of forming a light-transmitting solid polymer upon application of heat and pressure thereto (compression molding) while the materials are located within a suitable mold such as illustrated herein. By the term light-transmitting is meant a transmitting capability which in no way adversely effects the emission of the photoflash lamp(s) located therein. In other words, the light emission from the lamp is substantially equal to that provided by a typical lamp in the art today having a known protective coating such as cellulose acetate. Preferably, the resin powder when formed will provide a transparent coating.

Figure 4:
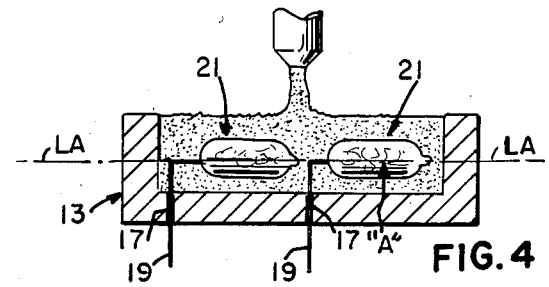

The resin powder 23 is deposited within cavity 15 to a first depth of only slightly greater than 0.10 inch. Thereafter, a plurality of lamps 21 are oriented within the mold such that linear segments of each lead-in wire 19 are inserted and retained within a respective one of the corresponding openings 17. Preferably, each opening has an internal diameter of only slightly larger than the external diameter of each wire to be positioned therein such that the wires are in effect frictionally held. In one example, wires 19 had an external diameter of 0.014 inch and holes 17 had a diameter of slightly less than 0.020 inch. In the event that larger diameter openings are used, material loss therethrough can be prevented by use of a suitable sealing means such as tape or putty. Once the wires are inserted, the lamp envelopes are bent to form approximately a 90 degree angle with the linear segments. In other words, the longitudinal axis LA—LA (FIG. 4) of each glass envelope forms an angle ("A") with the parallel wires 19 of each lamp. It is possible to prebend each envelope prior to lamp insertion and still achieve the desired results attained herein. With the lamps fully positioned within mold 13, a remaining quantity of about 0.10 ounces of resin powder is added as shown in FIG. 4 to substantially fill the cavity 15. This powdered resin is shown as flowing about and substantially surrounding the external surfaces of each envelope such that entire envelope of each lamp is completely encased.

Although it has been shown and described to locate powder 23 within mold 13 using a dual filling operation, it is within the scope of the invention to accomplish this phase using a single step. In other words, it is within the scope of the invention to initially insert each of the desired photoflash lamps within mold 13 and thereafter deposit the entire quantity of 0.20 ounces of resin and allow it to flow about and around the lamps in the manner shown. However, the dual filling procedure is preferred in that the first layer of resin serves to provide a bedding or similar resilient base upon which the envelopes of each lamp can rest and thus be more positively retained in a relatively secured position during the latter filling procedure. This dual filling operation thus substantially prevents "swimming" by the glass envelopes in a unique manner which in turn can adversely effect the positioning relationships of these components in the final products.

Figure 5:
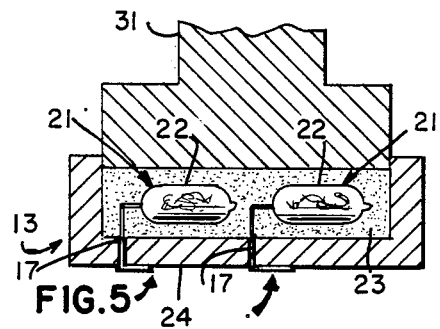

To further facilitate positioning of each of the photoflash lamps within mold member 13, it is preferred to bend or similarly deform the extreme end portions of each lead-in wire 19 upwardly against the bottom surface 24 of mold 13. This bending, illustrated in FIG. 5, in combination with the wire memory, substantially assures prevention of displacement of the envelopes in both an upwardly and downwardly manner in FIG. 5. More specifically, each envelope 22 is substantially prevented from engaging the internal surfaces of the mold cavity as well as being upwardly displaced to possibly project above the upper level of the powdered resin. This manner of positioning is particularly desired when using a single stage filling procedure. The described dual stage operation substantially eliminates any downward displacement due to the ability of the first layer of resin to provide the aforedescribed bedding or nesting under each envelope.

Figure 8:
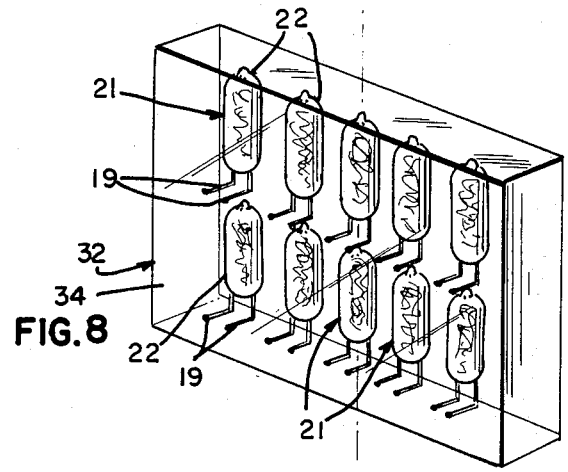
FIG. 8 illustrates a solid polymer member having a plurality of individual photoflash lamps encapsulated therein in accordance with the teachings of the instant invention.

With the lamps and powder located within the desired position in mold 13, heat and pressure are simultaneously applied to the powdered resin sufficient to cause it to liquify in its entirety within the mold. Pressure is applied by a ram component 31 which is lowered to engage the upper surface of the powder and compress it. The force exerted by ram 31 upon the thermoplastic resin powder 23 was preferably within the range of about 1500 pounds per square inch to about 2500 pounds per square inch for a period of within the range of about 10 to 20 minutes. The powdered resin was raised to a temperature of approximately 200 to 300 degrees Farenheit during this time period, said temperature sufficient to cause liquification thereof. In one specific example of the invention, the powdered thermoplastic resin was subjected to a force of 2,000 pounds per square inch for 15 minutes at a temperature of 250 degrees Farenheit. Surprisingly, there was no damage to any of the relatively delicate glass envelopes during this relatively harsh compression molding operation. In addition, each of the envelopes was retained within its desired orientation such that the final, desired orientation in the completed product was attained. This arrangement shown in FIG. 8, is such that two parallel rows of flashlamps, each having five lamps therein, is formed. Accordingly, a total of ten lamps are shown as having been encapsulated using the teachings herein. Understandably, however, it is within the scope of the invention to encapsulate larger or smaller numbers of lamps and to do so in a variety of different patterns. The substantially planar, dual row pattern illustrated in FIG. 8 is preferred in order to produce a component which can be specifically utilized in a finished product defined in accordance with the teachings of the copending applications defined hereinbelow.

The aforedescribed parameters (ram pressures, temperatures, etc.) are preferably those employed during compression molding of the thermoplastic resin powder. As stated above, it is also within the scope of the invention to use thermosetting resins, these including phenolic, melamine, urea, epoxy, silicone, and polyester. Use of such materials allows for much broader parameter ranges. For example, should phenolic be used, mold temperatures may range from about 280 to about 400 degrees Farenheit. Pressures exerted vary of course, on the material being molded and the final configuration desired. Low pressure materials (e.g., polyester glass-reinforced bulk molding and sheet molding compounds) can be molded at pressures as low as about 500 pounds per square inch. while highly filled or heavily reinforced compounds may accept pressures as high as about 8000 pounds per square inch. Mold times used for thermosetting resins may also be reduced over times for the above-defined thermoplastic resin. For example, the cure time for general purpose phenolic, when molding with cold material, can be as low as about one minute for each 0.125 inch of the finished part's cross-section.

Figure 6:
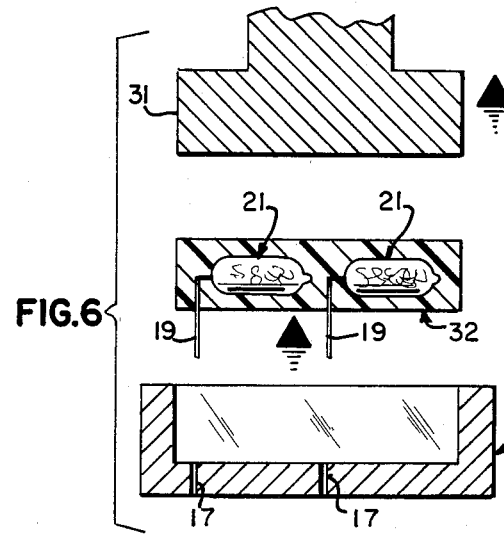

After liquification of resin material 23 is attained, the contents within the mold are cooled for a predetermined time period while the aforementioned pressure is still applied. Cooling was accomplished simply by placing the mold and its contents in a room temperature (70 degrees Farenheit) environment for a period of approximately thirty minutes. It is understandably within the scope of the invention to increase the cooling time period through the use of various cooling means as part of the mold member itself (e.g., fins) and further description is not believed necessary. When the light-transmitting, solid polymer component is formed, the ram is withdrawn and the member removed from the base of the mold member 13, as illustrated in FIG. 6. Immediately prior to removal, however, it was necessary to straighten each of the individual lead-in wires 19 to the original linear configuration at insertion.

The resulting member (32) as shown in FIG. 8 thus constitutes a robust, solid article capable of readily withstanding shock and/or other harsh treatment without harm to the several photoflash lamps contained therein. This member is thus ready for further manufacturing in order to produce a finished, photoflash device such as those illustrated in corresponding applications under Ser. No. 183,915, entitled "Miniature Photoflash Unit With Encapsulated Flash Lamps" (Inventors: A. C. Bouchard et al), filed Sept. 2, 1980, now U.S. Pat. No. 4,375,953, and Ser. No. 262,008, entitled "Miniature Photoflash Unit Using Subminiature Flash Lamps" (Inventors: A. C. Bouchard et al.), filed May 8, 1981, now U.S. Pat. No. 4,424,020. As described in each of these applications, the lead-in wires of each photoflash lamp are electrically connected to a corresponding circuit path defined on a planar substrate member. With regard to the instant application, this planar substrate and circuitry can be bonded to the reverse or back side (number 34 in FIG. 8) of the solidified polymer member 32 and in contact with respective ones of the exposed portions of each lead-in wire 19. A suitable epoxy can be used to secure the substrate and circuitry to the polymer member 32, and a corresponding tab or similar member provided having extensions of the circuitry thereon in order to connect the finished device to the electrical circuitry associated with a corresponding camera. The completely finished product as thus described is fully capable for use with many of today's cameras which typically utilize disposable, multilamp photoflash devices well known in the art. The product as described herein, however, represents a substantially smaller version of such devices, as well as one which can be manufactured at less expense. The addition of other components, such as reflective means for each lamp 21, is also possible, with examples described in the corresponding, copending applications.

Figure 7:
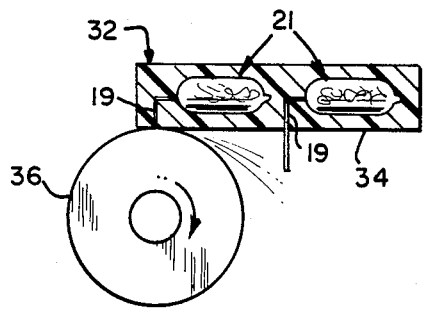
FIG. 7 illustrates an alternative operation which may be performed on a polymer article as produced by the steps illustrated in FIGS. 1-6.

It is also within the scope of the invention to electrically connect the lead-in wires 19 of the several lamps within the polymer member 32 by other means than those described in the copending applications mentioned. In the simplest form, it is possible to connect the lamps in a series relationship using electrical wiring and suitable switching components of a variety known in the art. The resulting circuit path can in turn be connected to a tab or similar projection which is insertable within a socket typically provided in each of the aforementioned cameras. It is preferred, however, to connect the lamps to the circuit paths and planar substrate members as described in the corresponding applications. When doing so, and when using the planar substrate having the planar circuitry located on the face of the substrate which abuts the external surface 34, it is preferred to remove all portions of lead-in wires which project from the planar external surface of the polymer member. By way of example, in one embodiment of the invention these external, projecting portions were ground off (FIG. 7) by a suitable grinding implement 36 until each was flush with the external surface 34.

Figure 9:
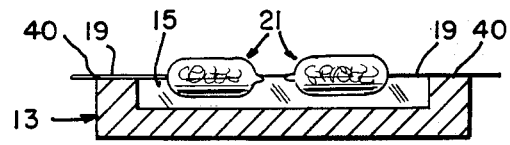
FIGS. 9-11 illustrate the various steps in a method of providing a protective coating on a glass envelope of at least one photoflash lamp in accordance with an alternate embodiment of the invention.
Figure 10:
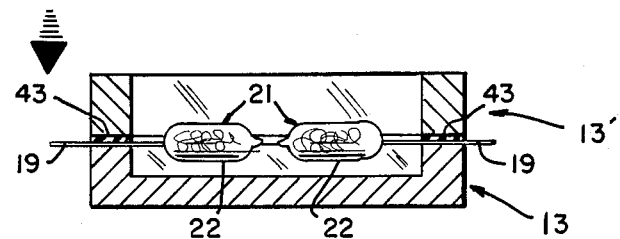
Figure 11:
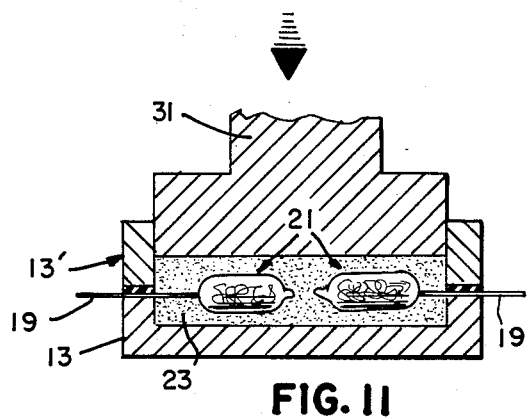

In FIGS. 9-11, there is illustrated the various steps in providing a coating for a plurality of photoflash lamps in accordance with an alternate embodiment of the invention. In FIG. 9, the lead-in wires 17, linear in configuration, are each positioned atop a surface of the base mold member 13 in the tip-to-tip orientation shown. Understandably, a mechanical or similar holding means could be used to retain the lamps in position prior to the subsequent steps defined below. With the lamps in position, a second mold member 13' is lowered to positively engage surfaces 40 and portions of each of the projecting lead-in wires 19. To provide a seal about the wires against the base mold member 13, the second, upper mold member 13' includes a rubber or similar resilient seal 43 about its lower edge. With both mold members secured together and providing a seal therebetween, the desired quantity of powdered resin is added to sufficiently surround each of the lamp's glass envelopes. This filling procedure can be accomplished in the dual step operation described above or by a singular step as also described above. The second or upper mold member 13' is also preferably metallic and of the same material for the lower mold member 13 as shown in FIG. 10 and as also used in the method described in FIGS. 1-6. Pressure and heat is thereafter applied (FIG. 11) in the same manner described in FIG. 5 sufficient to liquify the powdered resin 23 about each of the glass envelopes. The same levels of heat and pressure as applied above were also applied in the method illustrated in FIGS. 9-11.

The minimum thickness of polymer about each of the lamps encapsulated using the teachings of the instant invention was 0.10 inch. In many locations of the completed article (32), this thickness was obviously substantially greater.

There has thus been shown and described a new and unique method of forming protective coverings on a plurality of photoflash lamps oriented in a fixed relationship (e.g., planar) so as to totally encapsulate all of said lamps and produce a solidified, robust light-transmitting polymer member which can thereafter readily form part of a finished photoflash unit. It is readily understood that the method described herein, in its broadest aspects, is also used to provide a coating of the nature described on only a singular photoflash lamp.

The invention as described is readily adaptable to mass production and utilizes a minimum of material, thus reducing cost of the finished product. The transparent polymer material assures at least the same index of refraction as was attainable using the separate, thinner cover members typically used in multilamp devices currently available in the art. As described, the thickness of the encapsulating polymer material was much greater than that of the aforedescribed thermoplastic coatings to thus assure additional reinforcement and protection in the finished product. Hermeticity is also substantially improved over these techniques in that the entire external surface of each glass envelope, as well as portions of the lead-in wires projecting therefrom, are completely encased within the polymer material. In effect, this represents a second seal for the glass envelope at the press-sealed end to provide additional means of preventing leakage thereat. The finished product thus has a longer shelf life than earlier multilamp products.

It is also within the scope of the invention to provide additonal reinforcement of the polymer member by the use of glass fibers therein, said fibers preferably being added to the powder resin prior to depositing thereof within the mold cavity. It is even further within the scope of the invention to add color-correcting blue dyes or similar material to the polymer during formation thereof in the event that it is desired to modify the light output.

While there have been shown and described what are at present considered the preferred embodiments of the invention, it will be obvious to those skilled in the art that various changes and modifications in addition to those described may be made therein without departing from the scope of the invention as defined by the appended claims.

We claim:
1. A method of forming a protective coating on the glass envelopes of a plurality of photoflash lamps wherein each of said envelopes includes a combustion-supporting gas therein established at several atmospheres of pressure and a pair of thin lead-in wires projecting from said envelope, said method comprising:
   providing a mold member including a plurality of openings therein;
   positioning a first quantity of a powdered thermoplastic or thermosetting resin material capable of forming a light-transmitting, solid polymer upon application of heat and pressure thereto within said mold member to a preestablished depth within said mold member;
   inserting each of said thin lead-in wires of said photoflash lamps within a respective one of said openings within said mold member to a predetermined depth and thereafter bending portions of said lead-in wires against an external surface of said mold member, each of said glass envelopes resting atop said first quantity of said powdered resin material and being spacedly positioned from the internal surfaces of said mold member, each of said lead-in wires being further bent at an angle of about 90 degrees from the longitudinal axis of the respective one of said glass envelopes from which said lead-in wire projects after said wire is inserted within said opening to enable said envelope to attain said resting position atop said first quantity of said powdered resin material;
   positioning a second quantity of said powdered resin material within said mold member to cover each of said envelopes, said powdered resin material thereby surrounding the external surfaces of said envelopes;
   simultaneously applying pressure and heat to said powdered resin material sufficient to liquify said powdered resin material about said glass envelopes, said pressure within the range of from about 500 to about 8000 pounds per square inch and said temperature sufficient to heat said powdered resin material about said glass envelopes within the range of from about 200 to about 400 degrees Farenheit, said thin lead-in wires assisting in retaining said glass envelopes in said spaced positioning relationship within said mold member during said simultaneous application of said heat and pressure to said powdered resin material;
   cooling said liquified material to form said light-transmitting, solid polymer about said glass envelopes; and
   removing said solid polymer material having said glass envelopes therein from said mold member, portions of said lead-in wires projecting from said glass envelopes and extending from said solid polymer upon removal from said mold member, said method further including removing all of said extending portions.

2. The method according to claim 1 wherein sad powdered resin material is a thermosetting resin selected from the group consisting of phenolic, melamine, urea, polyester, epoxy, and silicon.

3. The method according to claim 2 wherein said powdered resin material is heated to said temperature for a time period of about 1 to about 20 minutes.

4. The method according to claim 1 wherein said liquified material is cooled while said pressure is applied to said material.

5. The method according to claim 4 wherein said material is cooled by exposing said mold having said material therein to room temperature for a predetermined time period.

6. The method according to claim 1 wherein said glass envelopes of said photoflash lamps are oriented in a substantially planar array within said mold member, said array comprising a pair of two substantially parallel rows each containing a similar number of said lamps.

7. The method according to claim 6 wherein the number of lamps in each of said two substantially parallel rows is five.

8. A method of forming a protective coating on the glass envelopes of a plurality of photoflash lamps wherein each of said envelopes includes a combustion-supporting gas therein established at several atmospheres of pressure and a pair of thin lead-in wires projecting from said envelope, said method comprising:

provideing a mold member including a plurality of openings therein;

positioning a first quantity of a powdered thermoplastic or thermosetting resin material capable of forming a light-transmitting, solid polymer upon application of heat and pressure thereto within said mold member to a preestablished depth within said mold member;

inserting each of said thin lead-in wires of said photoflash lamps within a respective one of said openings within said mold member to a predetermined depth and thereafter bending portions of said lead-in wires against an external surface of said mold member, each of said glass envelopes resting atop said first quantity of said powdered resin material and being spacedly positioned from the internal surfaces of said mold member, each of said lead-in wires being further bent at an angle of about 90 degrees from the longitudinal axis of the respective one of said glass envelopes from which said lead-in wire projects prior to said inserting of said wire within said opening to enable said envelopes to attain said resting position atop said first quantity of said powdered resin material;

positioning a second quantity of said powdered resin material within said mold member to cover each of said envelopes, said powdered resin material thereby surrounding the external surfaces of said envelopes;

simultaneously applying pressure and heat to said powdered resin material sufficient to liquify said powdered resin material about said glass envelopes, said pressure within the range of from about 500 to 8000 pounds per square inch and said temperature sufficient to heat said powdered resin material about said glass envelopes within the range of from about 200 to about 400 degrees Farenheit, said thin lead-in wires assisting in retaining said glass envelopes in said spaced positioning relationship within said mold member during said simultaneous application of said heat and pressure to said powdered resin material;

cooling said liquified material to form said light-transmitting, solid polymer about said glass envelopes; and removing said solid polymer material having said glass envelopes therein from said mold member, portions of said lead-in wires projecting from said glass envelopes and extending from said solid polymer upon removal from said mold member, said method further including removing all of said extending portions.

9. The method according to claim 8 wherein said powdered resin material is a thermosetting resin selected from the group consisting of phenolic, melamine, urea, polyester, epoxy, and silicon.

10. The method according to claim 9 wherein said powdered resin material is heated to said temperature for a time period of about 1 to about 20 minutes.

11. The method according to claim 8 wherein said liquified material is cooled while said pressure is applied to said material.

12. The method according to claim 11 wherein said material is cooled by exposing said mold having said material therein to room temperature for a predetermined time period.

13. The method according to claim 8 wherein said glass envelopes of said photoflash lamps are oriented in a substantially planar array within said mold member, said array comprising a pair of two substantially parallel rows each containing a similar number of said lamps.

14. The method according to claim 13 wherein the number of lamps in each of said two substantially parallel rows is five.

* * * * *